(12) United States Patent
Ben-Shalom

(10) Patent No.: US 8,525,962 B2
(45) Date of Patent: Sep. 3, 2013

(54) ENCAPSULATED PIXELS FOR DISPLAY DEVICE

(71) Applicant: Amir Ben-Shalom, Modiin (IL)

(72) Inventor: Amir Ben-Shalom, Modiin (IL)

(73) Assignee: Powermat Technologies, Ltd, Neve Ilan (IL)

( * ) Notice: Subject to any disclaimer, the term of this patent is extended or adjusted under 35 U.S.C. 154(b) by 0 days.

(21) Appl. No.: 13/685,285

(22) Filed: Nov. 26, 2012

(65) Prior Publication Data

US 2013/0083281 A1    Apr. 4, 2013

Related U.S. Application Data

(60) Division of application No. 12/984,884, filed on Jan. 5, 2011, now Pat. No. 8,319,925, which is a continuation of application No. PCT/IL2009/000681, filed on Jul. 8, 2009.

(60) Provisional application No. 61/129,604, filed on Jul. 8, 2008.

(51) Int. Cl.
*G02F 1/1333* (2006.01)

(52) U.S. Cl.
USPC .............................. 349/122; 349/86; 345/211

(58) Field of Classification Search
None
See application file for complete search history.

(56) References Cited

U.S. PATENT DOCUMENTS

2006/0202665 A1 *   9/2006   Hsu .............................. 320/139
2007/0279002 A1 *  12/2007   Partovi ......................... 320/115

* cited by examiner

*Primary Examiner* — Richard Kim
(74) *Attorney, Agent, or Firm* — Brooks Kushman P.C.

(57) ABSTRACT

A display device comprising an array of encapsulated pixels. The encapsulating pixel includes an optical element which is altered from a first optical state to a second optical state upon when a potential difference is generated across it. The optical element is in contact with two electrodes which are connected to a pixel driver for generating the potential difference. The encapsulated pixel is hermetically sealed from the environment by a sealing layer and the driver receives power wirelessly via an inductive power transmission system.

10 Claims, 5 Drawing Sheets

ENCAPSULATED PIXELS FOR DISPLAY DEVICE

CROSS-REFERENCE TO RELATED APPLICATIONS

This application is a division of U.S. application Ser. No. 12/984,884 filed Jan. 5, 2011, which is a continuation of International Application No. PCT/IL2009/000681 filed Jul. 8, 2009, which claims priority to U.S. Provisional Application 61/129,604 filed Jul. 8, 2008, the disclosures of which are hereby incorporated by reference in their entirety.

FIELD OF THE INVENTION

The present invention is directed to providing a visual display unit. More specifically, the invention is directed to providing a display device that is protected from the environment by encapsulation.

BACKGROUND

Visual display units (VDUs) are used to present information visually. Electronic VDUs include television sets and computer monitors for example. They receive information as electric signals and convert them for display as visual images on a screen.

Electronic display units, such as liquid crystal displays (LCDs), for example, may consist of pixels, which are discrete optical elements. The optical states of these elements change in response to an electrical potential (voltage) applied thereacross. The optical characteristics, such as the polarization thereof, scattering angle and reflectivity of each pixel depend upon these optical states. By providing voltage selectively to each pixel of the display, a visual image may be constructed and displayed.

Active optical elements such as liquid crystals, may deteriorate over time. Exposure to dampness and air within the environment may hasten this deterioration, particularly where the optical elements are susceptible to oxidation. Typically, the optical elements are protected from the environment by being sandwiched between two substrates. Depending upon the particular configuration, such substrates can include a number of functional layers such as glass or plastic panels, polarizers, alignment layers, color filters and electrodes. The electrodes, which provide an excitation voltage across the optical elements, are connected to an external power source via conductive pathways.

Connecting wires crossing the protective layer introduce leaky channels through which air seepage may occur, thereby hastening the deterioration of the optical elements.

A further cause of deterioration of visual displays is the excitation voltage itself which can cause some optical elements, such as liquid crystals, to be degraded by electrolysis. Much time and effort is devoted to finding cost effective solutions to overcome this problem. For example, in some systems the polarity of the excitation voltage is preconfigured to reverse periodically such that, over time, the net voltage across through the optical element is zero.

There is a need therefore for a visual display unit in which optical elements are protected against degradation from environmental influences and electrolysis. The present invention addresses this need.

SUMMARY OF THE INVENTION

In accordance with a first objective, the present invention is directed to providing a display device comprising: at least one encapsulated pixel, the pixel comprising at least one optical element having at least two optical states, the optical element being in conductive contact with at least two electrodes; and a driver for generating a potential difference across the electrodes thereby altering the optical element from a first optical state to a second optical state. The encapsulated pixel is hermetically sealed from the environment by a sealing layer. Optionally, the display comprises an array of the encapsulated pixels.

Preferably, the optical element has at least two stable optical states such that the optical element remains in the second optical state when the potential difference is removed. Typically the optical element is a liquid crystal.

According to certain embodiments, the encapsulated pixel comprises an insulating encapsulation, for example a material selected from glasses, ceramics and polymers and combination thereof.

In a preferred embodiment, a first set of n parallel electrode strips and a second set of m parallel electrode strips, and a plurality of the optical elements, each the optical element being conductively connected to at least a first electrode selected from the first set of electrodes and a second electrode selected from the second set of electrodes, wherein each electrode strip is conductively connected to a dedicated driver.

Optionally the display incorporates an array of the encapsulated pixels. Typically, the array includes: a first set of n parallel electrode strips and a second set of m parallel electrode strips, the first set being aligned at an angle to the second set such that the electrode strips cross at n×m intersections; and n×m optical elements arranged at the intersections in conductive contact with a first electrode from the first set and a second electrode from the second set, thereby forming an array of n×m the encapsulated pixels.

According to certain embodiments of the invention, the driver comprises at least one secondary inductor configured to inductively receive power from an external primary inductive coil wired to a power supply.

Typically, the electrodes and secondary coil comprise a transparent conductive material such as ITO. Optionally, the secondary coil encompasses at least a portion of the array.

The display may further include ferromagnetic material for improving inductive coupling between the primary inductive coil and the secondary inductor.

It is a further objective of the current invention to teach a method for producing at least one encapsulated pixel for a display device, the method comprising the following steps: providing a first substrate comprising a first transparent conductor; fabricating a first electrode from the first transparent conductor; fabricating a first coil on the first transparent conductor; providing a second substrate comprising a second transparent conductor; fabricating a second electrode from the a second transparent conductor; fabricating a second coil onto the second transparent conductor; stacking the first substrate together with the second substrate; introducing an active optical material between the first substrate and the second substrate to form a pixel; and sealing the pixel from the environment.

Optionally, at least one electrode is a strip electrode. The electrodes may be fabricated by etching the conductor. Alternatively the electrodes may be fabricated by printing onto the conductor.

Typically, at least one coil is fabricated by etching the conductor. Alternatively, the coil is fabricated by printing onto the conductor.

Variously the display device may be selected from the group consisting of advertising boards, framed picture displays, calculators, digital clock displays, vehicle dashboards, electrical monitors, computer screens, television screens, ebook displays, presentation boards, walling units, flooring, roofing and combinations thereof.

BRIEF DESCRIPTION OF THE DRAWINGS

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice. In the accompanying drawings.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
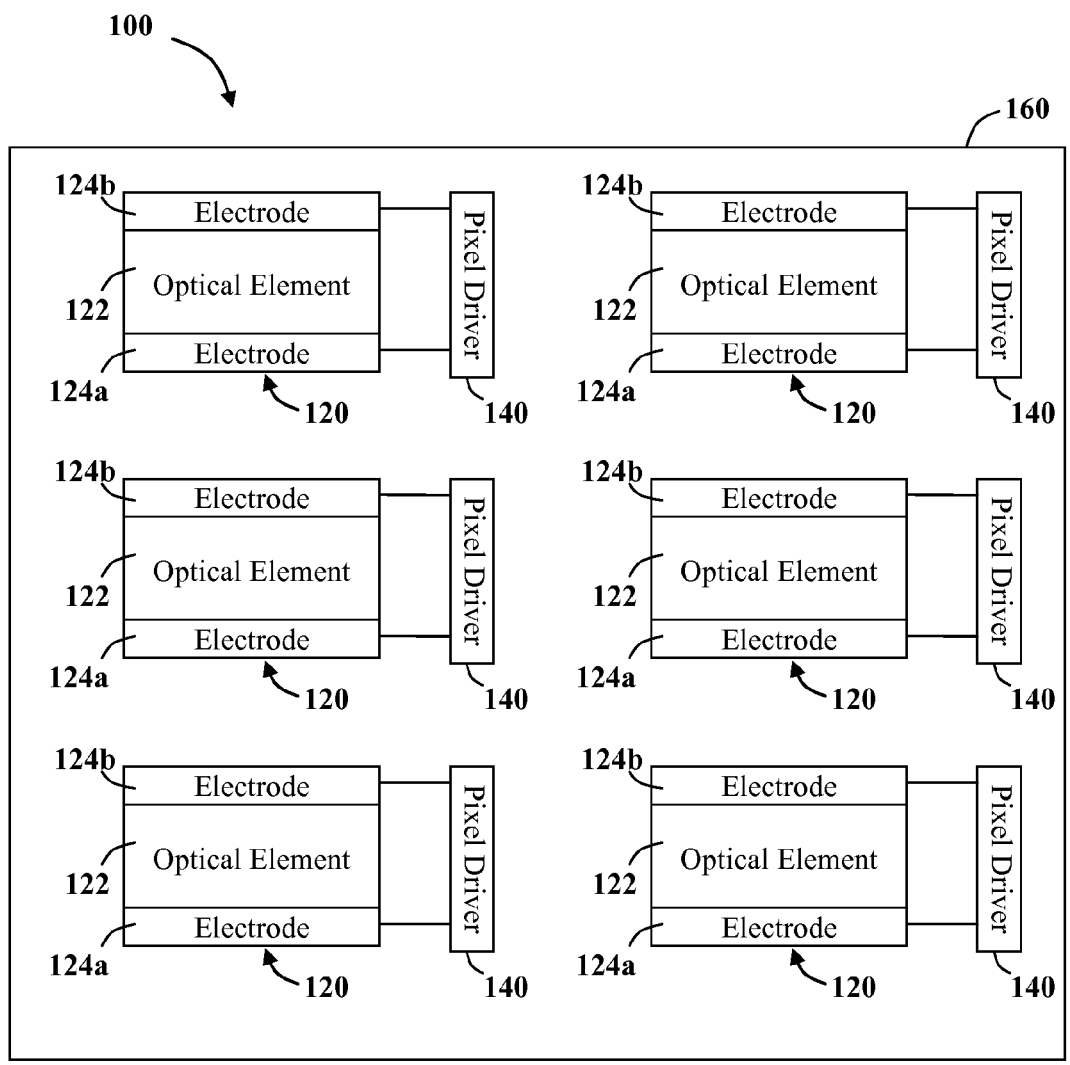
FIG. 1 is a block diagram showing a schematic representation of a display device incorporating a plurality of encapsulated pixels according to a first embodiment of the present invention.

Reference is now made to FIG. 1 showing a block diagram representing the main components of an encapsulated display device 100 according to a first embodiment of the current invention. The display device 100 comprises a plurality of pixels 120.

Each pixel 120 includes an optical element 122 sandwiched between two electrodes 124a, 124b wired to a pixel driver 140. It is a particular feature of the current invention that the pixel 120 and pixel driver 140 are hermetically sealed from the environment by an encapsulating sealing layer 160 therearound.

The optical element 122 includes an optically active material, such as a liquid crystal, capable of assuming two or more physical states, the optical characteristics thereof, depending upon its state. The driver 140 is configured to provide a switching voltage across the electrodes 124 such that when the switching voltage exceeds a predetermined threshold, the optical state of the optical element changes from a first optical state to a second optical state. For example, a switching voltage may cause a polarization effect, absorbing some of the light passing through liquid crystals such that the intensity of the light beam passing therethrough varies with the voltage.

According to some embodiments, the optical element may be a monostable material which is actively held in its second optical state for as long as the switching voltage is maintained above the threshold. A number of monostable display technologies are known in the art and include, for example scattering devices, twisted nematic devices (TN), super-twisted nematic devices (STN), vertically aligned nematic devices (VAN), in-plane switching (IPS), electrically controlled surfaces (ECS) and the like.

In preferred embodiments, the optical element is selected to be a bistable material in which the first optical state and the second optical state are both stable. In a bistable device, the switching voltage switches the optical element from the first stable optical state to the second stable optical state and when the switching voltage is removed the second optical state is maintained. A number of bistable display technologies are known in the art and include, for example ferroelectric liquid crystal devices (FLC), BiNem devices, zenithally bistable devices (ZBD), post-aligned bistable displays (PABN), cholesteric liquid crystal devices (CLCD) and the like.

Figure 2A:
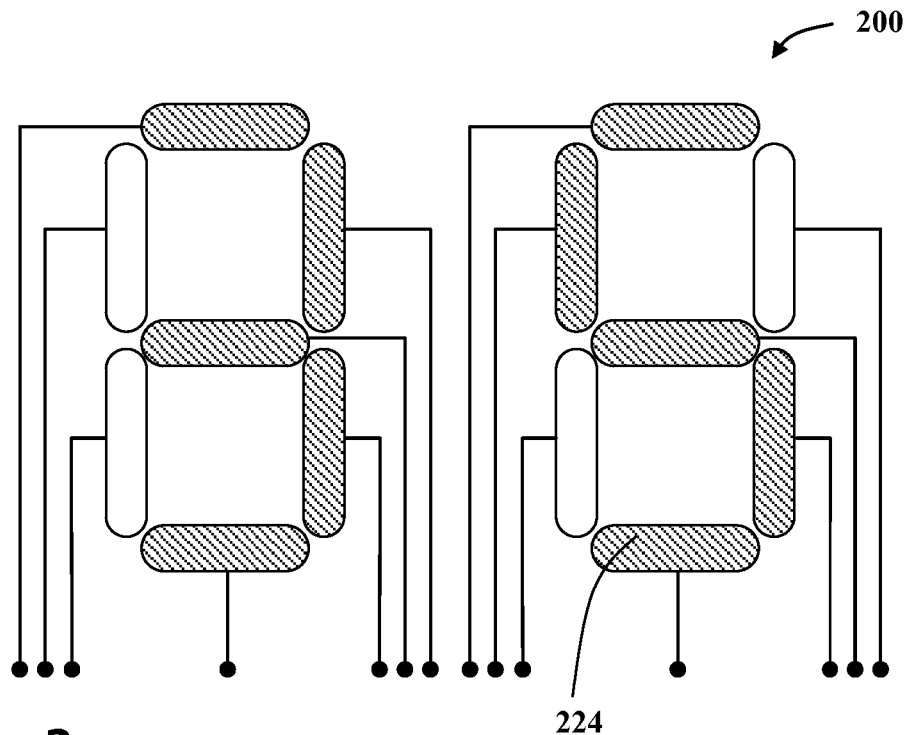
FIG. 2a is a schematic representation of a simple seven segment display.
Figure 2B:
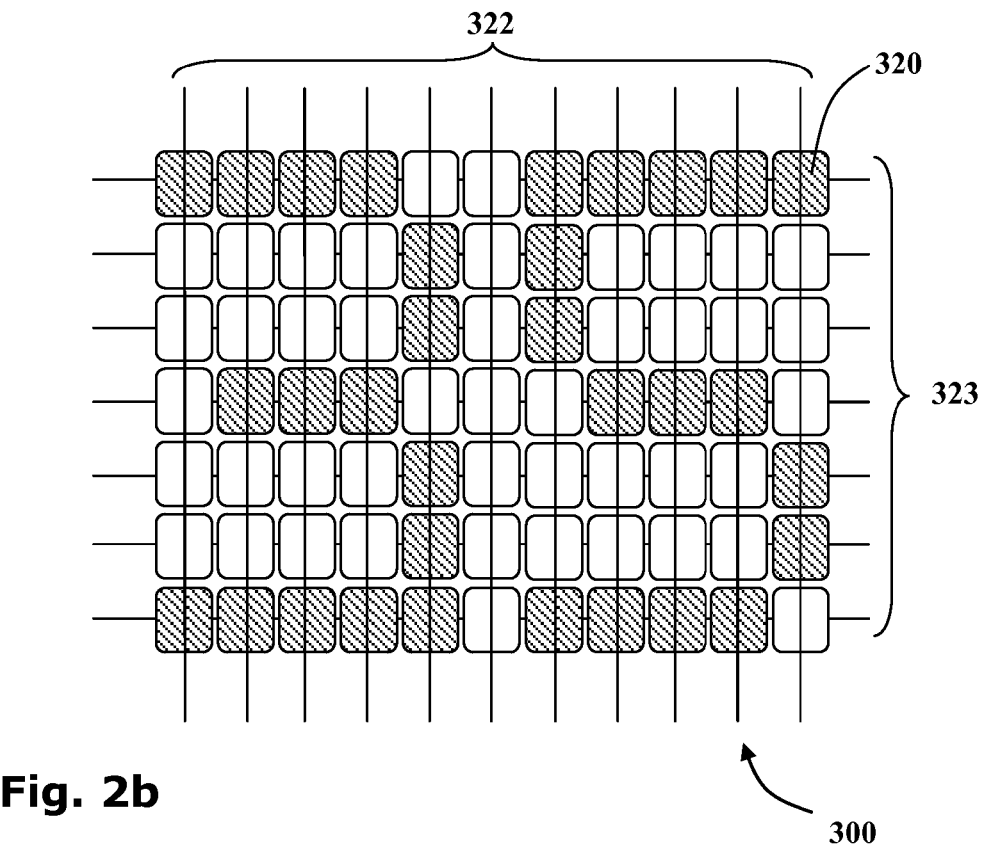
FIG. 2b is a schematic representation of a dot matrix display.

Reference is now made to FIGS. 2a and 2b showing two ways to construct an image with pixels in an encapsulated display device according to further embodiments of the invention. FIG. 2a shows a simple seven segment display 200 as used in various displays, particularly numeric displays such as pocket calculators, digital clock displays, vehicle dashboards and the like. In the segment driving method, shaped electrode segments 224 are wired to dedicated pixel drivers (not shown) and may used to construct numbers, letters, icons and the like.

FIG. 2b shows a dot matrix 300 as used for high-resolution displays, such as televisions screens and computer monitors. The matrix driving method constructs characters and images from a matrix of pixel dots. The pixels 320 of the matrix may be driven directly using dedicated drivers in a manner similar to the segments of the segment driving method. However, if there are n rows and m columns, a direct driving method needs connections. Thus, as the number of pixels is increased, the wiring of dedicated drivers becomes increasingly complex.

Alternatively, the so called multiplex driving method may be used. The pixels are arranged at the intersections of vertical signal electrodes (or column electrodes) 322 and horizontal scanning electrodes (or row electrodes) 323. Thus all the pixels across each row are connected together on one substrate and all the pixels in each column are connected on the opposite substrate. To switch a pixel, a voltage (+V) is applied to the row including that pixel, and then an opposite voltage (−V) is applied to the column including that pixel, with no voltage being applied to the columns which do not need to be switched. Thus instead of requiring connections, a multiplex method only requires connections.

It will be appreciated that in applications where the electrodes and connecting wires would otherwise obscure the viewers line of sight to the optical element, it is advantageous to use electrodes constructed from a transparent conductive material such as indium tin oxide (ITO) for example.

The sealing layer 160 (FIG. 1) of the encapsulated display device is provided to protect the optical elements 122 from deterioration through aeration and oxidation. According to certain embodiments of the invention, the sealing layer 160 is configured to encapsulate a single pixel individually. Alternatively a sealing layer 160 may be provided encapsulating a plurality of pixels or even an entire display matrix. Typically, the sealing layer 160 is an electrically insulating coating, such as glass, ceramic, polymer, epoxy, lacquer, silicon based glue, RTV or the like, which is laminated onto the surface of the pixel or group of pixels.

Because no conductive pathway is possible through such an insulating coating, in preferred embodiments of the invention, the pixel driver 140 (FIG. 1) is configured to receive power inductively across the insulating layer.

Inductive power coupling allows energy to be transferred from a power supply to an electric load without a conductive connection therebetween. A power supply is wired to a primary inductor, typically an inductive coil, and an oscillating electric potential is applied across the primary inductor, thereby inducing an oscillating magnetic field. The oscillating magnetic field may induce an oscillating electrical current in a secondary inductor placed close to the primary inductor but not in conductive contact therewith. In this way, electrical energy may be transmitted from a primary coil to a secondary coil by electromagnetic induction without the two coils being conductively connected.

Figure 3:
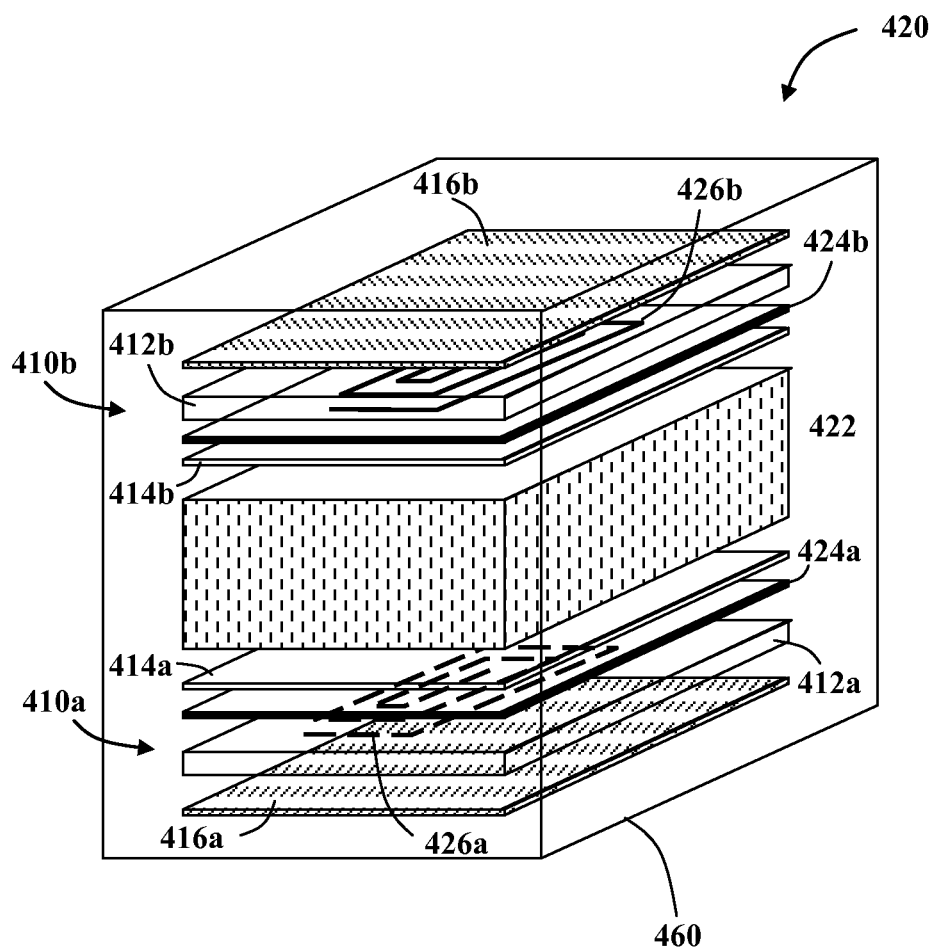
FIG. 3 is a schematic diagram of an encapsulated inductive pixel according to an exemplary embodiment of the invention.

Reference is now made to FIG. 3 showing an inductively enabled encapsulated pixel 420 hermetically sealed from the environment by a sealing layer 460 according to an exemplary embodiment of the current invention. The inductive encapsulated pixel 420 includes an optical element 422 sandwiched between an upper substrate 410a and a lower substrate 410b. Each substrate includes a glass plate 412a, 412b and, where required, additional functional layers, such as polarizers 416a, 416b, alignment layers 414a, 414b, color filters or mirrors.

The substrates 410 also support the pixel driver 420, consisting of two electrodes 424a, 424b in conductive contact with the optical element 422. The electrodes 424a, 424b are wired to inductive coils 426a, 426b which are in conductive contact with each other. In certain embodiments a ferrite layer may additionally be provided for improving the efficiency of the inductive coupling.

Figure 4:
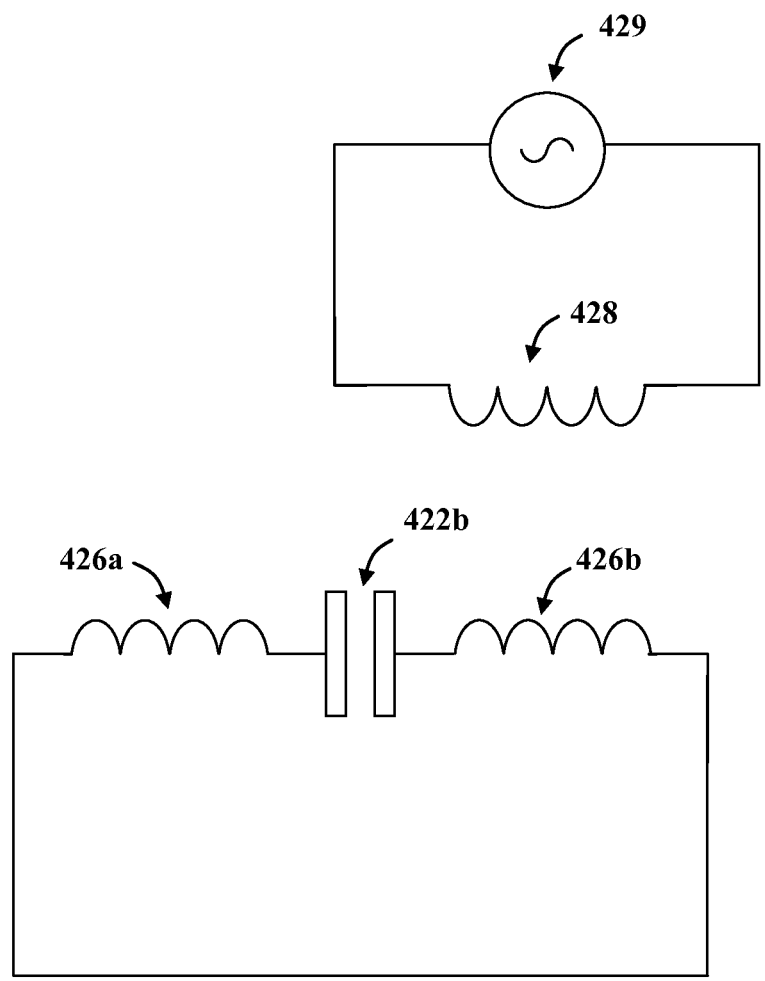
FIG. 4 is a circuit diagram of the pixel driver of the exemplary embodiment.

An electrical circuit diagram of the pixel driver 420 is represented in FIG. 4. The inductive coils 426a, 426b are shown to be wired in series with the optical element which behaves electrically as a capacitor.

The inductive coils 426a, 426b are configured to inductively couple with a primary inductor 428, wired to an oscillating voltage source 429. The inductive coils 426 of the pixel driver 420 behave as secondary inductors thereby receiving power from the primary inductor 428, which is brought into proximity therewith. An oscillating voltage is thus induced in the secondary coils 426 which provides the switching voltage to the electrodes 424.

It will be further appreciated that the polarity of the electrode voltage, in an inductively driven pixel, oscillates. Consequently, the net voltage across the optical element 422 is zero. Thus, in contradistinction to direct current drivers of the prior art, cumulative degradation of optical element 422 by electrolysis is intrinsically avoided.

Although the single encapsulated pixel 420 described in the exemplary embodiment hereabove may be driven by the segment driving method, it will be appreciated that the multiplex driving method may be used to drive inductive pixel drivers by connecting driving coils to each strip electrode. Alternatively coils may be provided; each connected a specific pair of electrodes such that each coil drives a single pixel.

Furthermore, the resonance of the inductive pixel 420 is dependent upon the inductance of the secondary coils 424 and the capacitance of the optical element 422. According to certain embodiments, the resonance of each pixel is uniquely selected such that a single primary coil may be configured to drive a plurality of pixels by selecting an oscillating frequency known to resonate with a specific secondary coil associated with a specific pixel driver.

According to a further embodiment of the invention a free standing display is constructed from inductive pixels with bistable optical elements. Such a free standing display may be configured to receive data in the form of electrical signals and maintain a visual image even after the signals have been removed. One advantage of such a display is that it needs no permanent electrical infrastructure or power source. A free standing display of this type may be useful, for example, for advertisement boards situated at a distance from a source of electricity. Such advertising boards can be configured to display a particular image by inductively applying a signal thereto, and will retain that image until actively switched back, despite not having power actively applied thereto.

It is noted that display devices using encapsulated pixels may be incorporated into various applications for example including but not limited to the following: advertising boards, framed picture displays, calculators, digital clock displays, vehicle dashboards, electrical monitors, computer screens, television screens, ebook displays, presentation boards, walling units, flooring, roofing and the like, as well as combinations thereof.

Figure 5:
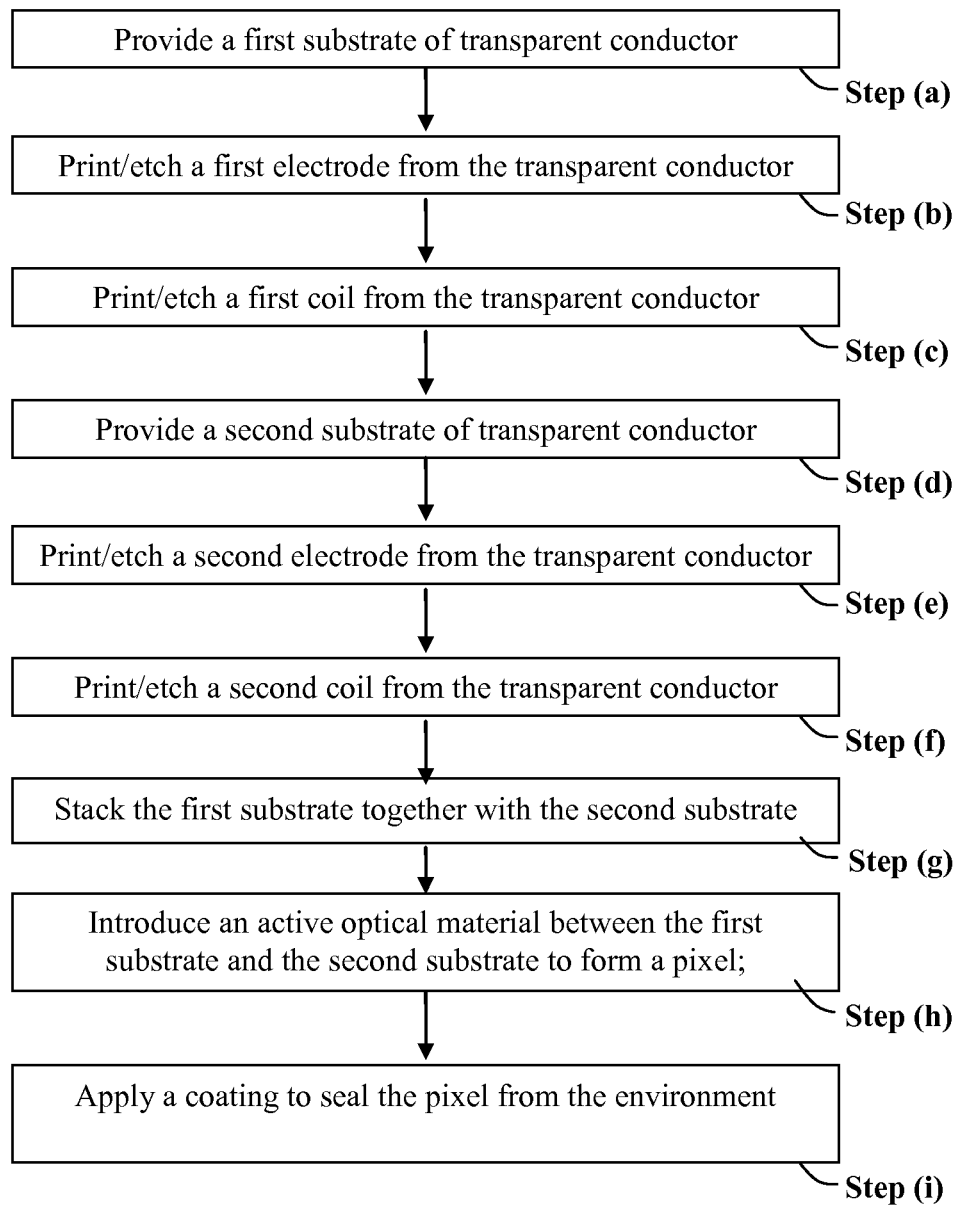
FIG. 5 is a flowchart showing a method for producing an encapsulated pixel according to still another embodiment of the invention.

With reference now to FIG. 5, a flowchart is presented, showing a method for producing an encapsulated pixel for a display device according to still a further embodiment of the invention. The method includes the following steps: providing a first substrate comprising a first transparent conductor such as indium tin oxide (ITO); printing or etching a first electrode from the first transparent conductor; printing or etching a first coil onto the first transparent conductor; providing a second substrate comprising a second transparent conductor; printing or etching a second electrode from the a second transparent conductor; printing or etching a second coil onto the second transparent conductor; stacking the first substrate together with the second substrate; introducing an active optical material between the first substrate and the second substrate to form a pixel; and sealing the pixel from the environment.

The scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A display device comprising at least one encapsulated pixel, said encapsulated pixel comprising:
    at least one optical element having at least two optical states, at least two electrodes;
    a driver for generating a potential difference between said electrodes such that said optical element is altered from a first optical state to a second optical state; and
    a sealing layer configured to hermetically seal said encapsulated pixel;
    wherein said driver comprises at least one secondary inductor connected to said electrodes and configured to inductively couple with an external primary inductor wired to a power supply.

2. The display device of claim 1 comprising an array of said encapsulated pixels wherein said sealing layer is configured to encapsulate each said pixel individually.

3. The display device of claim 1 wherein each said encapsulated pixel has a characteristic resonant frequency such that said external primary inductor is capable of driving selected pixels by selecting an oscillating frequency known to resonate with a specific secondary inductor.

4. The display device of claim 1 wherein said optical element has at least two stable optical states such that said optical element remains in said second optical state when said potential difference is removed.

5. The display device of claim 1 wherein said optical element is a liquid crystal.

6. The display device of claim 1 wherein said sealing layer encapsulated pixel comprises an insulating coating.

7. The display device of claim 1 wherein said sealing layer comprises a material selected from a group consisting of glasses, ceramics, polymers and combinations thereof.

8. The display device of claim 1 wherein said electrodes comprise a transparent conductive material.

9. The display device of claim 1 wherein said secondary inductor comprises a transparent conductive material.

10. The display device of claim 1 further comprising ferromagnetic material for improving inductive coupling between said primary inductor and said secondary inductor.

* * * * *